(12) United States Patent
Welker

(10) Patent No.: US 7,093,822 B2
(45) Date of Patent: Aug. 22, 2006

(54) MAGNETIC WIRE PULLING SYSTEM

(76) Inventor: Robert E. Welker, 1403 Appleton Ct., Arnold, MO (US) 63010

( * ) Notice: Subject to any disclaimer, the term of this patent is extended or adjusted under 35 U.S.C. 154(b) by 0 days.

(21) Appl. No.: 10/880,399

(22) Filed: Jun. 29, 2004

(65) Prior Publication Data

US 2005/0285088 A1 Dec. 29, 2005

(51) Int. Cl.
*B66F 3/00* (2006.01)
*G10H 3/00* (2006.01)

(52) U.S. Cl. ............... 254/134.3 R; 254/134.3 FT

(58) Field of Classification Search ......... 254/134.3 R, 254/134.3 FT, 134.4, 134.3 SC, 134.5, 134.3 PA, 254/134.3 CL, 134

See application file for complete search history.

(56) References Cited

U.S. PATENT DOCUMENTS 6,264,171 B1 * 7/2001 Hoium et al. ............ 254/134.4
6,824,329 B1 * 11/2004 Van Bijsterveld et al. .. 405/184
2004/0211949 A1 * 10/2004 Turner ................ 254/134.3 FT
2005/0285088 A1 * 12/2005 Welker ............... 254/134.3 FT
2005/0285089 A1 * 12/2005 Welker ............... 254/134.3 FT

* cited by examiner

*Primary Examiner*—Lee D. Wilson

(57) ABSTRACT

A magnetic wire pulling system advances wire through a house or other structure around obstacles with a string tied to a pulling cord then tied to the wire. The system has small, medium, and large magnets, and tools attracted to the magnets. The round small and medium magnets are tied upon strings wound upon spools. The spools have pins to secure magnets. The tools comprise a retrieval tool, a manual release tool, an insertion tool, an automatic release tool, a transfer tool, an extensible prop, and a telescoping pole with magnet. The tools deliver a magnet into the structure of a house, retrieve a magnet from the structure, or transfer a magnet from one tool to another tool. In operation, a bigger magnet attracts a smaller magnet or a magnet attracts a tool to advance a string beyond an obstacle to continue pulling wire.

7 Claims, 12 Drawing Sheets

MAGNETIC WIRE PULLING SYSTEM

BACKGROUND OF THE INVENTION

The present invention relates to a magnetic wire pulling system for use in routing electrical wires through walls. The magnetic wire pulling system has particular utility in routing wires through corners, crawlspaces, and other difficult locations.

Magnetic wire pulling systems are desirable for assisting electricians in routing conduits or wires through intersections of walls and floors, and difficult to reach places in structures. In structures, electrical wiring looks unsightly and architects and electricians labor to keep wiring hidden away. In new construction, electricians run wire through floors, walls, and ceilings before the finished surface is installed. In existing structures, electricians run wires inside finished wall, floor, and ceiling spaces. In some buildings, electricians remove ceiling tiles to run wires long distances and then drop the wires into walls. In other buildings, electricians have to fish wire between two desired locations. Fishing wire includes running a string first between desired locations. Then an electrician ties a pulling cord to the string and advances the pulling cord to the second location. Third, the electrician ties wire or conduit to the pulling cord and advances the wire to the second location for installation in a fixture.

When fishing wire, electricians encounter obstacles within structures that impede string from advancing to a second location. Crawl spaces as basements or attics, sill plates at wall and floor intersections, headers at wall and ceiling intersections, and rafters in attics, among others, impede fishing of wire. Commonly, electricians use steel band, known as fish tape, in an attempt to overcome an obstacle during fishing. An obstacle usually takes many attempts before the electrician successfully advances string beyond the obstacle. An electrician inserts the fish tape at a known point and extends the tape beyond the obstacle to reach a second point. At the second point, an electrician may hit the second point precisely or more likely, an electrician has to capture the fish tape with a second piece of fish tape. With fish tape being steel, magnets may capture fish tape at the second point.

DESCRIPTION OF THE PRIOR ART

The use of a magnets to assist electricians in wire pulling is known in the prior art. For example, the patent to Flowers, U.S. Pat. No. 4,527,775, shows a fish tape device which is guided through a wall by means of an electromagnet on the outside of the wall. Similar to the present invention, the patent discloses a roller on the end of fish tape which is guided by a magnet outside of the wall. The patent specifically refers to feeding conduit but not Romex cable or other types of electrical wiring. Unlike this patent, the present invention has a strong magnet on the end of semi rigid wire or tube for final fishing of the tape near an access opening.

The patent to Smith, William V., U.S. Pat. No. 4,039,142, shows a device for mechanically inserting a wire under a carpet that differs noticeably from the present invention.

The patent to Hale, U.S. Pat. No. 4,572,561, shows a device for locating a wire with an iron slug upon the end. This patent has a liquid filled container that has a magnet within which responds as it approaches the slug on the wire placed within a wall. Another magnet then retrieves the wire from the wall akin to the retrieval tool of the present invention.

The patent to Flowers, U.S. Pat. No. 4,618,124, covers a method of operating the apparatus in Flowers' '775 patent above. This method utilizes a magnet shaped like a roller to draw a wire within a wall under the influence of a stronger magnet located outside the wall. Changing the apparent polarity of the roller magnet during rolling may cause difficulties in this method. The present invention does not have a roller magnet.

Then the patent to Shanahan, U.S. Pat. No. 3,971,543, shows a pendulum like chain and magnet that align together within a wall. An installer places the chain within a wall to guide a wire towards the magnet in the wall below. The present invention lacks a magnetized chain.

The patent to James, U.S. Pat. No. 5,522,630, shows an electromagnet lowered into and through a wall, where fish tape secures to the electromagnet. The present invention does not use electrically induced magnetism.

The patent to Walsten et al., U.S. Pat. No. 5,820,249, shows a lighted device that fits onto the end of fish tape. The device illuminates the interior of a wall and guides an electrician to find the device and pull wire through the wall.

While the above-described devices fulfill their respective, particular objectives and requirements, the aforementioned patents and website do not describe a magnetic wire pulling system with two magnets that pulls a string beyond an obstacle and has an assortment of tools to manipulate the magnets.

Therefore, a need exists for a new and improved magnetic wire pulling system that can be used for advancing string and then wire beyond obstacles in structures. In this regard, the present invention substantially fulfills this need. Further, the magnetic wire pulling system according to the present invention substantially departs from the conventional concepts and designs of the prior art, and in doing so provides a device primarily developed for the purpose of using magnets upon the ends of strings to connect string and then advance the string through a structure.

SUMMARY OF THE INVENTION

In view of the foregoing disadvantages inherent in the known types of magnetic wire pullers now present in the prior art, the present invention provides an improved magnetic wire pulling system, and overcomes the above-mentioned disadvantages and drawbacks of the prior art. As such, the general purpose of the present invention, which will be described subsequently in greater detail, is to provide a new and improved magnetic wire pulling system and method which has all the advantages of the prior art mentioned heretofore and many novel features that result in a magnetic wire pulling system which is not anticipated, rendered obvious, suggested, or even implied by the prior art, either alone or in any combination thereof.

To attain this, the present invention essentially comprises a system for pulling wire through a house or other structure with a string tied to a pulling cord then tied to the wire. The system has small and medium magnets, a large magnet, and one or more tools attracted to the magnets. In operation, a bigger magnet attracts a smaller magnet or a magnet attracts a tool to advance a string beyond an obstacle to pull wire. The round small and medium magnets are tied upon one end of strings with eyelets on the opposite ends and the strings wind upon spools. The large round magnet has a covering and sufficient strength to attract the small magnet through sheetrock of one half inch thickness or greater. The tools deliver a magnet into the structure of a house, retrieve a magnet from the structure, or transfer a magnet from one tool to another tool.

There has thus been outlined, rather broadly, the more important features of the invention in order that the detailed description thereof that follows may be better understood and in order that the present contribution to the art may be better appreciated.

The magnetic wire pulling system may also include grooves upon the magnets for string tying, polarity markings upon the magnets, pins upon the spools to secure the eyelets and the magnets, and these tools: a retrieval tool, a manual release tool attached to a fish stix for the small magnet, an insertion tool for the medium magnet, an automatic release tool attached to a section of conduit for the small magnet or the medium magnet, a transfer tool, an extensible prop with a header sized to accept the large magnet, and a telescoping pole with magnet.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and devices for carrying out the several purposes of the present invention. It is important, therefore, that the claims be regarded as including such equivalent constructions insofar as they do not depart from the spirit and the scope of the present invention.

It is therefore an object of the present invention to provide a new and improved magnetic wire pulling system that has all of the advantages of the prior art bench cabinets and none of the disadvantages.

It is another object of the present invention to provide a new and improved magnetic wire pulling system that may be easily and efficiently manufactured and marketed.

It is still another object of the present invention to provide a new and improved magnetic wire pulling system that may be readily applied to renovations and repairs in existing structures.

Even still another object of the present invention is to provide a new and improved magnetic wire pulling system that pulls wires from a basement to an attic.

Even still another object of the present invention is to provide a new and improved magnetic wire pulling system that traverses from the basement or attic to the ceiling of a room in a two story house.

Even still another object of the present invention is to provide a new and improved magnetic wire pulling system that passes through less than a three quarter inch diameter hole while minimizing cosmetic and structural damage.

Even still another object of the present invention is to provide a new and improved magnetic wire pulling system that locates reference points from floor to floor, or wall to wall in adjacent rooms or ceiling to attic.

Even still another object of the present invention is to provide a new and improved magnetic wire pulling system that can be carried and stored in lightweight portable storage case.

Even still another object of the present invention is to provide a new and improved magnetic wire pulling system that has low production cost.

Even still another object of the present invention is to provide a new and improved magnetic wire pulling system that performs a blind right angle pull from a wall into a ceiling.

Even still another object of the present invention is to provide a new and improved magnetic wire pulling system that reaches paces inaccessible to a person.

Even still another object of the present invention is to provide a new and improved magnetic wire pulling system that serves as a plumb-bob.

Lastly, it is an object of the present invention to provide a new and improved magnetic wire pulling system that can be used as a compass.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
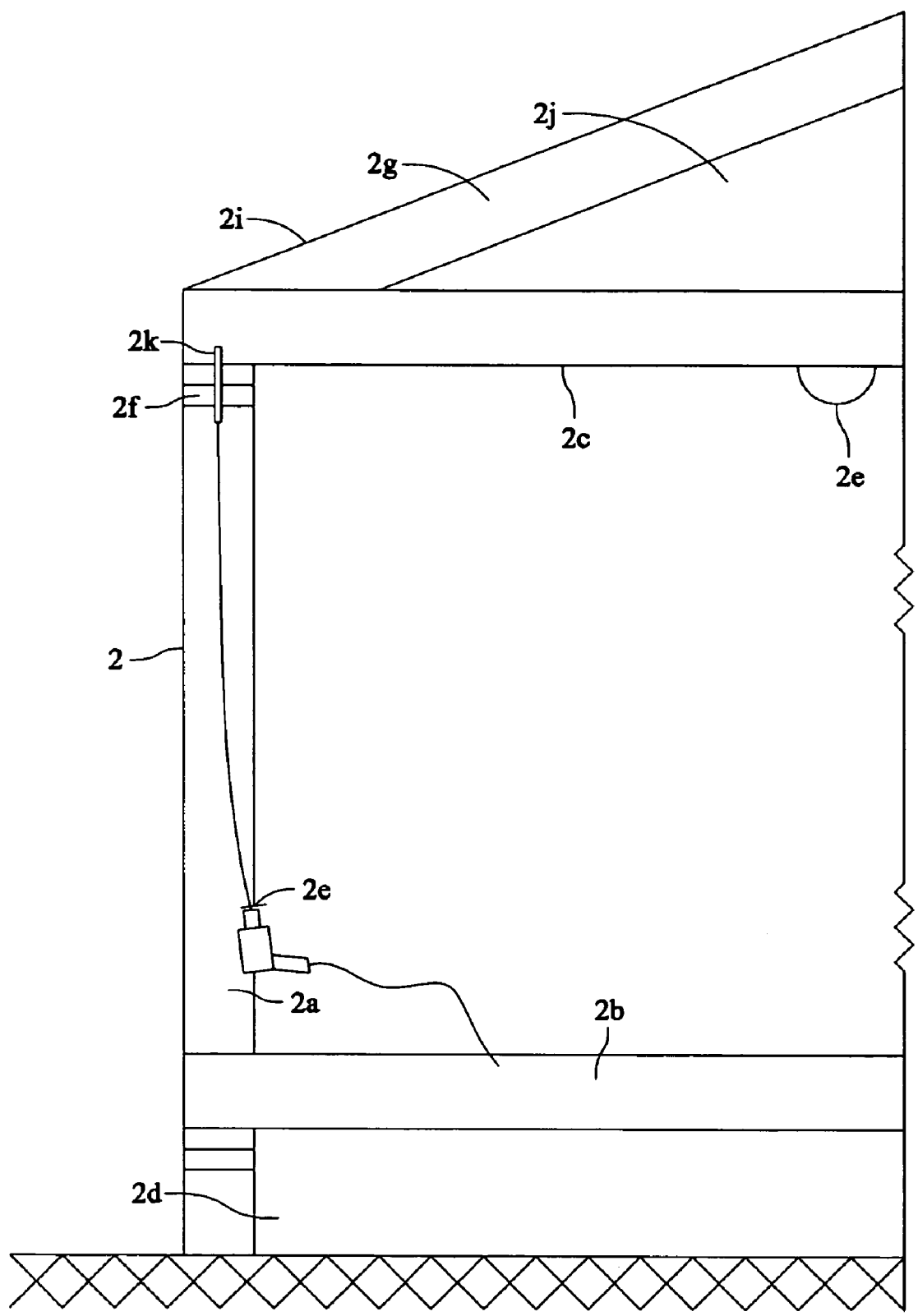
FIG. 1 is an elevation view of the structure of a house in which operates the preferred embodiment of the magnetic wire pulling system constructed in accordance with the principles of the present invention.

Referring now to the drawings, and particularly to FIGS. 1–13, a preferred embodiment of the magnetic wire pulling system of the present invention is shown and generally designated by the reference numeral 1.

In FIG. 1, the structure of a house is shown wherein the magnetic wire pulling system 1 operates. Though the preferred embodiment of the present invention is described in reference to a house 2, the present invention can be used in other structures and locations. The present invention overcomes the obstacles inherent with the intersections of walls 2a, floors 2b, and ceilings 2c as well as difficult to access places. Thus, FIG. 1 shows a house 2 with a crawlspace 2d upon the earth. Above the crawlspace 2d, the house 2 has a floor 2b with a wall 2a at the exterior. The wall 2a has an opening for one or more fixtures 2e. The fixtures 2e can be outlet, switches, and the like. The wall 2a has a cap plate 2f upon the top opposite the floor 2b. The cap plate 2f serves as a rest for the ceiling 2c joists. In FIG. 1, a drill with a flexbit 2k drills through the cap plate 2f to provide access between the wall 2a and the ceiling 2c. The joists are parallel and spaced apart by one story from the floor 2b. Suspended from the joists, a fixture 2e illuminates the floor 2b. Here, the fixture 2e is a light however other fixtures 2e such as fans are possible. From the joint of the joists with the wall 2a, rafters 2g rise at an angle towards the center of the house 2. The rafters 2g support the roof 2i and an attic 2j exists beneath the room. Attics 2j are usually insulated and rafters 2g have a sharp angled connection to the cap plate 2f increasing the difficulty in running wires.

Figure 2A:
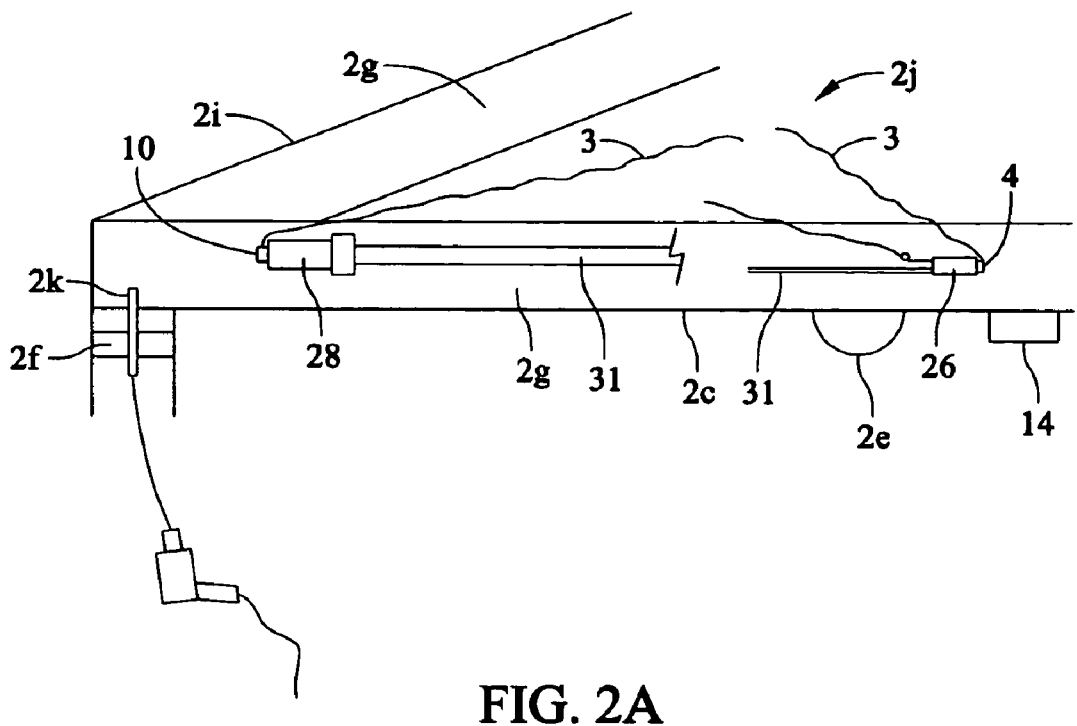
FIG. 2A is a detailed view of the ceiling and attic of a house with two tools of the preferred embodiment of the magnetic wire pulling system of the present invention in operation.

Turning to FIG. 2A, the present invention operates in the cramped quarters of an attic 2j. Near the eave, the flexbit 2k appears through the cap plate 2f and between two joists 2c. The present invention has a small magnet 4 with attached string 3 located upon the automatic release tool 28. The automatic release tool 28 joins a pole 31 so an electrician can reach the eave with less difficulty. As the small magnet 4 nears the flexbit 2k, magnetic attraction between the larger mass of the flexbit 2k attracts the small magnet 4 away from the lesser mass of the automatic release tool 28. The small magnet 4 moves when near the flexbit 2k. An electrician need not personally release the small magnet 4 when using the automatic release tool 28.

Also in FIG. 2A, a helper to the electrician positions the large magnet 14 upon the ceiling 2c beneath the joists. Here, the present invention has a small magnet 4 with attached string 3 controlled within the manual release tool 26. The manual release tool 26 also joins to a pole 31, particularly Greenlee Fish Stix™, so an electrician can reach less accessible areas. As the small magnet 4 nears the large magnet 14, the electrician grips a pull cord. The pull cord attaches to a ferrous plunger. When the small magnet 4 reaches a location desired by the electrician, the electrician pulls the cord which pulls the plunger, releasing the small magnet. The large magnet 14 then attracts the small magnet 4 and its attached string 3. In either tool, the electrician then ties the string 3 of the small magnet 4 to regular pulling cord which the electrician then uses to pull wire or conduit as desired.

Figure 2B:
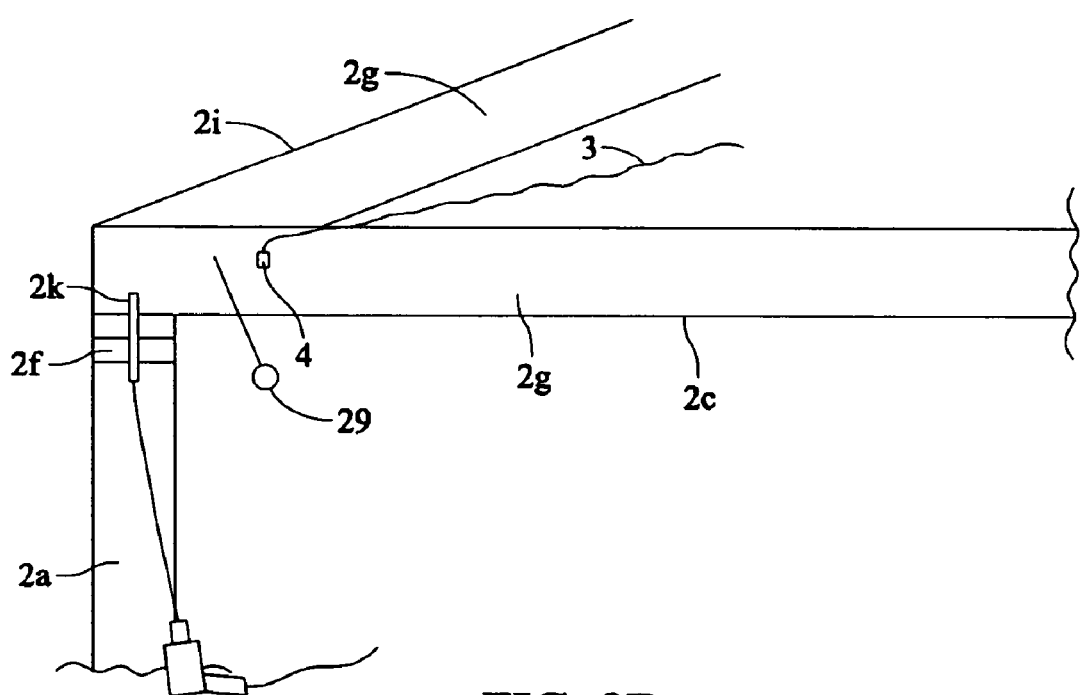
FIG. 2B is a detailed view of the wall at the edge of an attic of a house with tools of the preferred embodiment of the magnetic wire pulling system of the present invention in operation.

Beneath then in FIG. 2B, a drill has advanced a flexbit 2k through a cap plate 2f near the end of joists 2c. An electrician has released the small magnet 4 with attached string 3, so that the small magnet 4 attracts to the magnetic transfer tool 29 held by a helper. The magnetic transfer tool 29 passes through a small hole in the ceiling 2c near the corner. The helper bends, rotates, and pivots the magnetic transfer tool 29 so the small magnet 4 approaches the flexbit 2k. The larger ferrous mass of the flexbit 2k then attracts the small magnet 4 and then the magnetic transfer tool 29 is then pulled away leaving the small magnet 4 attached to the flexbit 2k. The helper then carefully pulls the flexbit 2k with the small magnet 4 out of the cap plate 2f and the wall 2a. The electrician then ties the string 3 of the small magnet 4 to pulling cord to pull wire around the intersection of the joist 2c with the wall 2a.

Figure 3A:
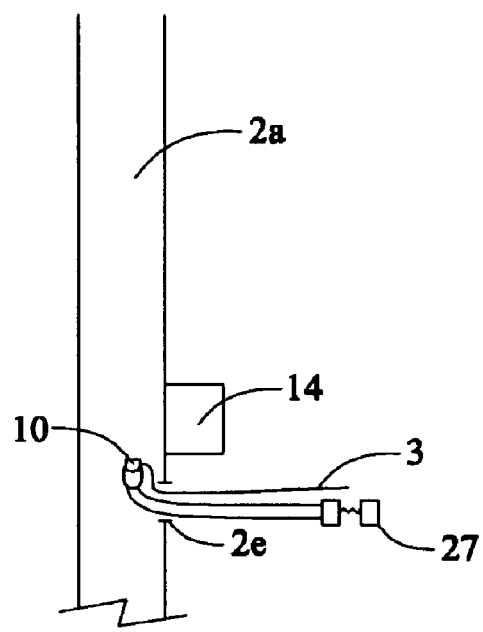
FIG. 3A is a elevation detailed view of a wall where operates one tool to insert a magnet of the magnetic wire pulling system of the present invention.

In walls like FIG. 3A, an electrician may desire to pull wire up a wall 2a to the corner for additional pulling into a ceiling 2c or upper floor 2b. To do this, an electrician places a medium magnet 10 upon the insertion tool 27. When placing the medium magnet 10 into the insertion tool 27, the electrician should make sure the identified (minus sign) side of the medium magnet 10 is visible. Placed in this position, the medium magnet 10 will be attracted to the large magnet 14. The electrician then places the insertion tool 27 through a fixture 2e opening in a wall 2a. Next the electrician positions the large magnet 14 upon the wall 2a proximate to the insertion tool 27. The electrician then releases the medium magnet 10 from the insertion tool 27. The large magnet 14 then attracts the medium magnet 10 on the opposite side of the wall 2a cladding. The electrician then drags the large magnet 14 up the wall 2a which brings the medium magnet 10 with string 3 up to the corner. Used in this tool, the medium magnet 10 assists in telephone wire or communications cable installation.

Figure 3B:
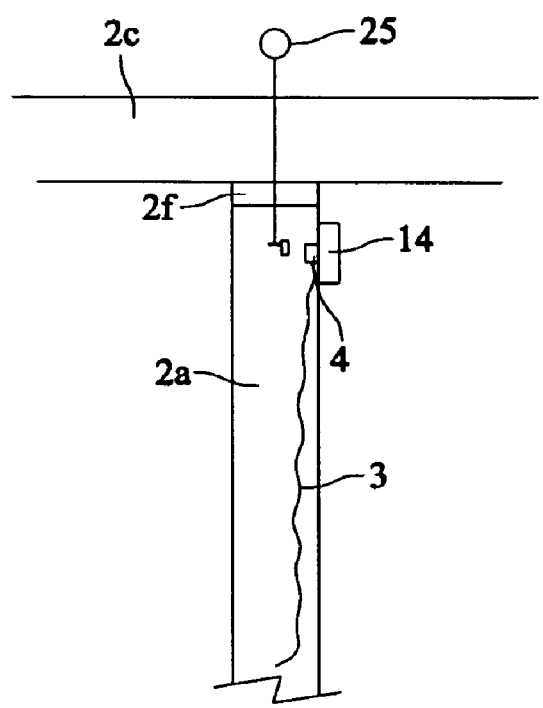
FIG. 3B is a elevation detailed view of a wall where operates another tool to retrieve a magnet of the magnetic wire pulling system of the present invention.

Alternatively, when the small magnet 4 attracted to the large magnet 14 reaches a corner in FIG. 3B, an electrician may seek to advance the small magnet 4 through the cap plate 2f. To do so, an electrician drills an access hole through the cap plate 2f and places the retrieval tool 25 vertically through the hole. The retrieval tool 25 has a ferrous end that attracts the small magnet 4 when the large magnet 14 is removed. With the small magnet 4 upon the ferrous end, the electrician pulls the retrieval tool 25, small magnet 4, and string 3 up.

Figure 3C:
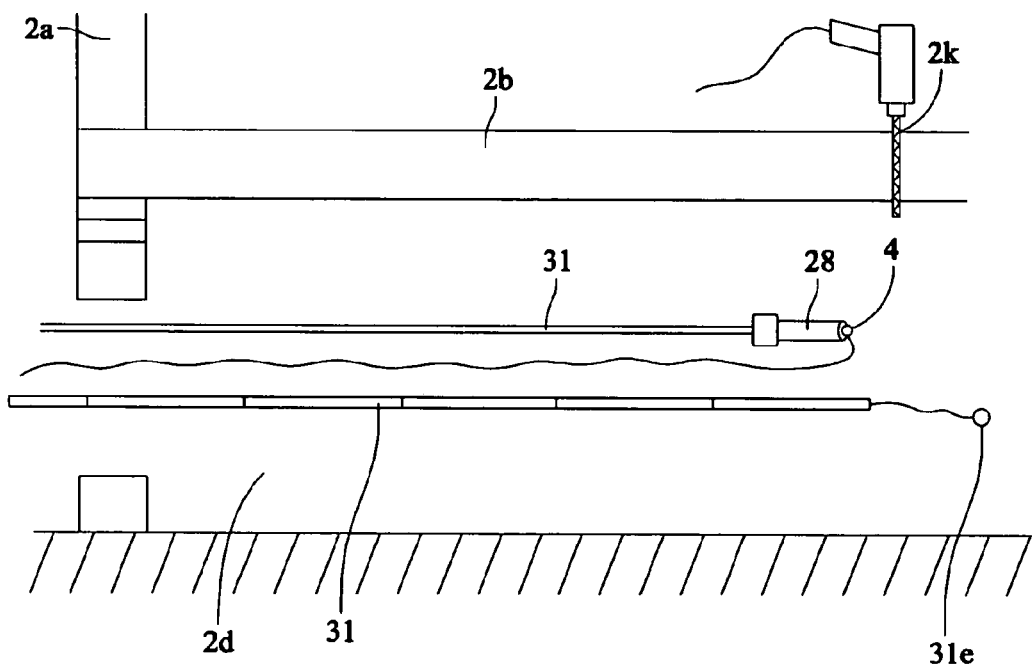
FIG. 3C is a elevation view of crawlspace where operates at a long distance two tools of the magnetic wire pulling system of the present invention.

Under a floor 2b in a crawlspace 2d like in FIG. 3C, an electrician may seek to run wire. The electrician then drills a hole in the floor 2b with a flexbit 2k. Akin to the attic 2j of FIG. 2A, the present invention has a small magnet 4 with attached string 3 located upon a reaching tool such as the automatic release tool 28, the manual release tool 26, or the telescoping pole 31 with magnet. The automatic release tool 28 joins a pole 31 so an electrician can reach across the crawlspace 2d with less difficulty. As the small magnet 4 nears the flexbit 2k, magnetic attraction between the larger mass of the flexbit 2k attracts the small magnet 4 away from the lesser mass of the automatic release tool 28. The small magnet 4 moves of its own accord when near the flexbit 2k. An electrician need not release the small magnet 4 when using the automatic release tool 28.

Alternatively, the present invention has a small magnet 4 with attached string 3 controlled within the manual release tool 26. The manual release tool 26 also joins to a pole 31, particularly Greenlee Fish Stix™, so an electrician can reach through the crawlspace 2d. As the small magnet 4 nears the flexbit 2k, the electrician grips a pull cord. The pull cord attaches to a ferrous plunger. When the small magnet 4 abuts the flexbit 2k, the electrician pulls the cord which pulls the plunger, releasing the small magnet. The larger mass of the flexbit 2k then attracts the small magnet 4 with its attached string 3.

Alternatively, the present invention has a telescoping pole 31 including a string 3 therein ending in a magnet 31e. Here, the electrician extends the pole 31 and unwinds the string 3. The electrician then places the telescoping pole 31 through the crawlspace 2d towards the flexbit 2k. When the fishing magnet 31e nears the flexbit 2k, the larger mass of the flexbit 2k attracts the fishing magnet 31e. A helper then withdraws the flexbit 2k with the fishing magnet 31e attached. The helper then connects pulling cord to the fishing magnet 31e. The electrician below then winds the string 3 which brings the pulling cord through the hole and the crawlspace 2d while collapsing the pole 31.

In these tools, the electrician then ties the string 3 of the small magnet 4 to regular pulling cord which the electrician then uses to pull wire or conduit as desired. Though a crawlspace 2d is shown, these tools and techniques work in basements and other long and less accessible areas in both new and existing construction.

Figure 4:
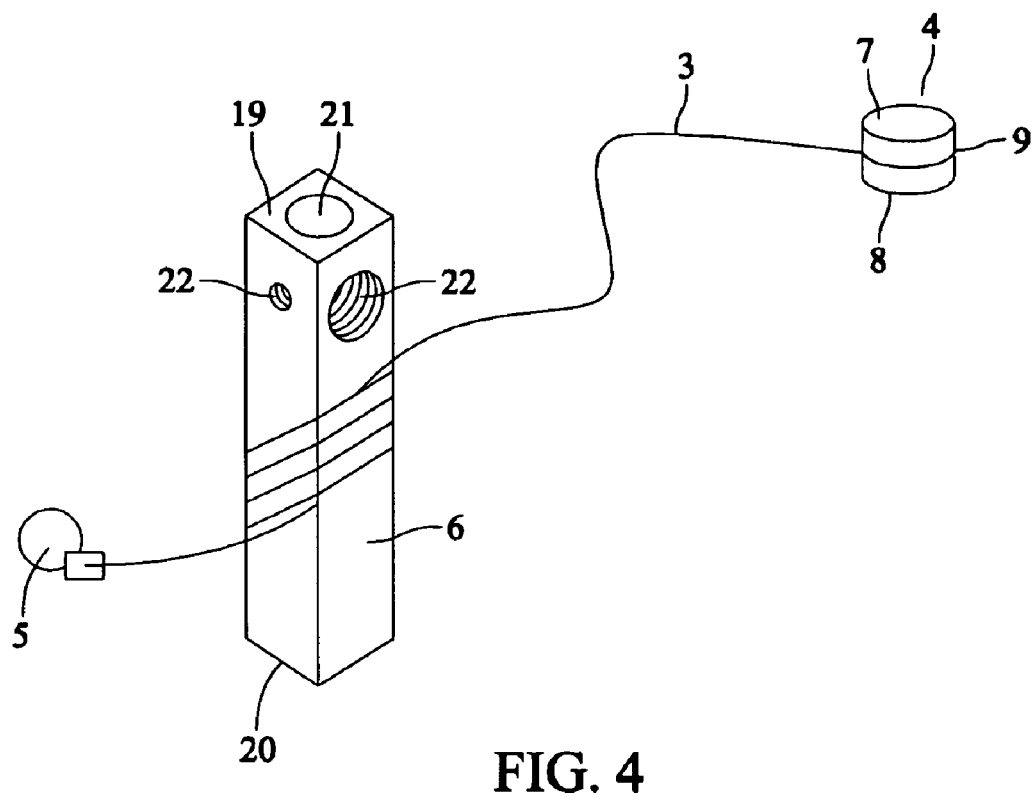
FIG. 4 is an isometric view of the small magnet tool with spool and string of the magnetic wire pulling system of the present invention.

After describing the present invention utilizing some tools in operation, FIG. 4 begins detailed descriptions of the tools. The present invention has its key part with the small magnet 4 attached to a string 3. The small magnet 4 has a generally round cylindrical shape, permanent magnetism, and polarity indicated upon the faces 7, 8 of the small magnet 4. Scoring as in a minus (−) sign or paint can indicate polarity. Generally centered upon the height of the small magnet 4, a groove 9 runs upon the perimeter parallel to the faces 7, 8 of the magnet 4. The groove 9 provides a location for a secure attachment of the string 3 to the small magnet 4.

The string 3 proceeds from the small magnet 4 towards the small spool 6. The string 3 is generally at least ten pound test line and abrasion resistant and has a length of at least five feet. At the spool, the string 3 winds around the small spool 6 but has an eyelet 5 crimped to the end opposite the string 3 magnet. The eyelet 5 is ferrous and eases joining of pulling cord to the string 3.

The small spool 6 has a generally rectangular cylindrical shape with four sides and two opposite ends 19, 20. Each end 19, 20 has a dimple 21 for ready holding of the spool between the thumb and the middle finger of an electrician. When unwinding the string 3, the spool spins freely between the thumb and the middle finger, thereby, reducing twisting and knotting of the string 3 during unwinding. Proximate to one end, the spool 6 has a small socket as the resting place for the small magnet 4. Two perpendicular pins 22, preferably ferrous screws, are placed in the spool 6 and are magnetized when the small magnet 4 is in the small socket. When magnetized, the screws 22 readily hold down the metal eyelet 5 on the end of the string 3. The string 3 will not unwind after being wound upon the small spool 6 because the eyelet 5 is held securely by magnetized screws 22.

Figure 5:
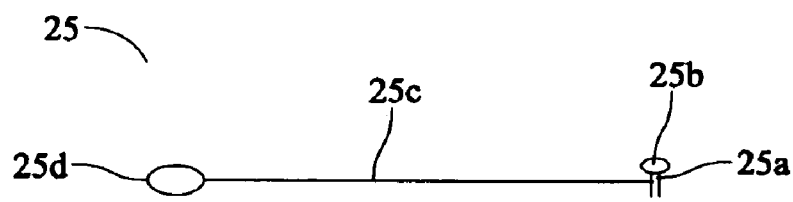
FIG. 5 is a side view of the retrieval tool of the magnetic wire pulling system of the present invention.

FIG. 5 describes the retrieval tool 25. The retrieval tool is generally ³⁄₃₂ inch diameter copper clad steel wire 25c. The retrieval tool 25 has an approximate length of one foot with two opposite ends. Upon one end, the retrieval tool 25 has the wire bent and secured into a loop 25d for an electrician's fingers. Upon the opposite end, the retrieval tool 25 has the wire in a tight spiral 25a that grasps a ferrous screw 25b. Other embodiments of the retrieval tool 25 are possible provided they have a handle 25d upon one end and a ferrous material upon the opposite end.

Figure 6A:
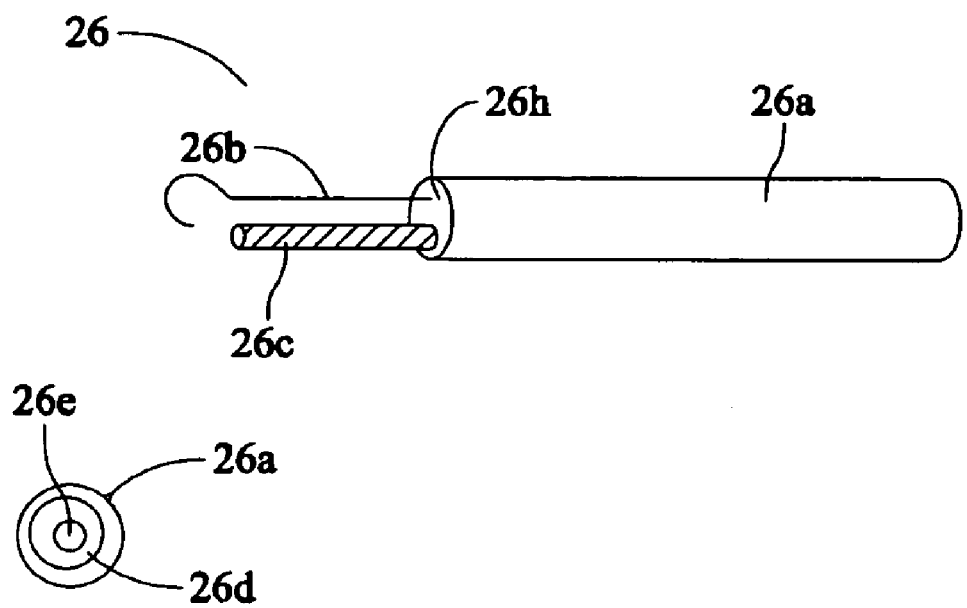
FIG. 6A is a side view of the manual release tool of the magnetic wire pulling system of the present invention and its end.

The manual release tool 26 appears in FIG. 6A. The manual release tool 26 has a nonmagnetic metal barrel 26a about 2 inches long and ⅝ inch diameter with a front end and a rear end. The front end has sufficient diameter to receive the small magnet 4. The front end of the barrel 26a has a brass washer 26d crimped into place inside of the barrel 26a about ¹⁄₃₂ inch from the end. This brass washer 26d acts as a stop for the plunger 26b inside the barrel 26a. The rear end has a plunger 26b and threaded rod 26c extending from a cover 26h. The threaded rod 26c provides attachment of the manual release tool 26 to a pole 31 such as Greenlee Fish Stix™. Viewing the front end of the manual release tool 26 in FIG. 6A, the manual release tool 26 has the nonmagnetic barrel 26a fixing a brass washer 26d with a centered ferrous head, preferably steel. The small magnet 4 attracts to the ferrous head.

Figure 6B:
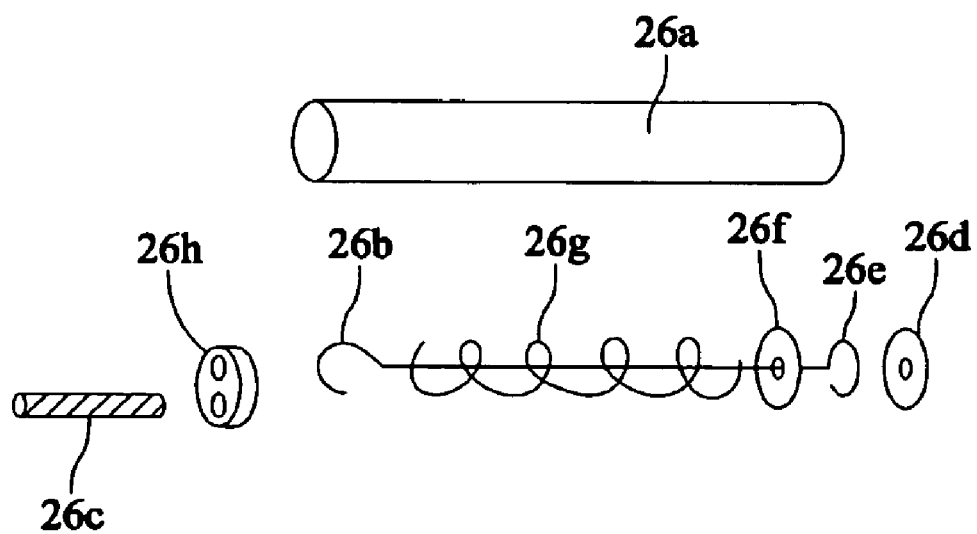
FIG. 6B is an exploded view of the manual release tool of the magnetic wire pulling system of the present invention.

Within the barrel 26a in FIG. 6B, the manual release tool 26 has the working parts here shown in an exploded view. Detached from the barrel 26a, the front end has a brass washer 26d with a central hole. Behind the brass washer 26d, the ferrous head 26e attaches to the tip of the plunger 26b. The plunger 26b has a compression spring 26g surrounding a ¹⁄₁₆ inch diameter stainless steel rod. The compression spring 26g fits within the barrel 26a. The stainless steel rod 26b has a 90 degree ¹⁷⁄₃₂ inch diameter loop 26e. Trapped between the loop 26e and the compression spring 26g is a small steel washer 26f to which the small magnet 4 attracts before the plunger 26b is pulled. The steel washer 26f fits against the compression spring 26g. The other end of the spring 26g rests upon the cover 26h in the rear end of the barrel 26a. The outer diameter of the spring 26g loosely fits inside the barrel 26a. These parts comprise the plunger 26b within the manual release tool 26. A closed hook is formed opposite the loop 26e for easy attachment of the string 3.

The rear end of the barrel 26a is closed by the cover 26h except for a small central hole. A threaded support stud 26c attaches to the cover 26h, offset from the center. This support stud fits directly into a Greenlee Fish Stix™, catalog number 540-1212. In use as in FIGS. 2 and 2A, when the barrel 26a is held fast, and the plunger 26b is pulled back by means of a pull string 3, the steel washer 26e is pulled away, releasing the small magnet 4 towards the large magnet 14 or other ferrous object.

Figure 7:
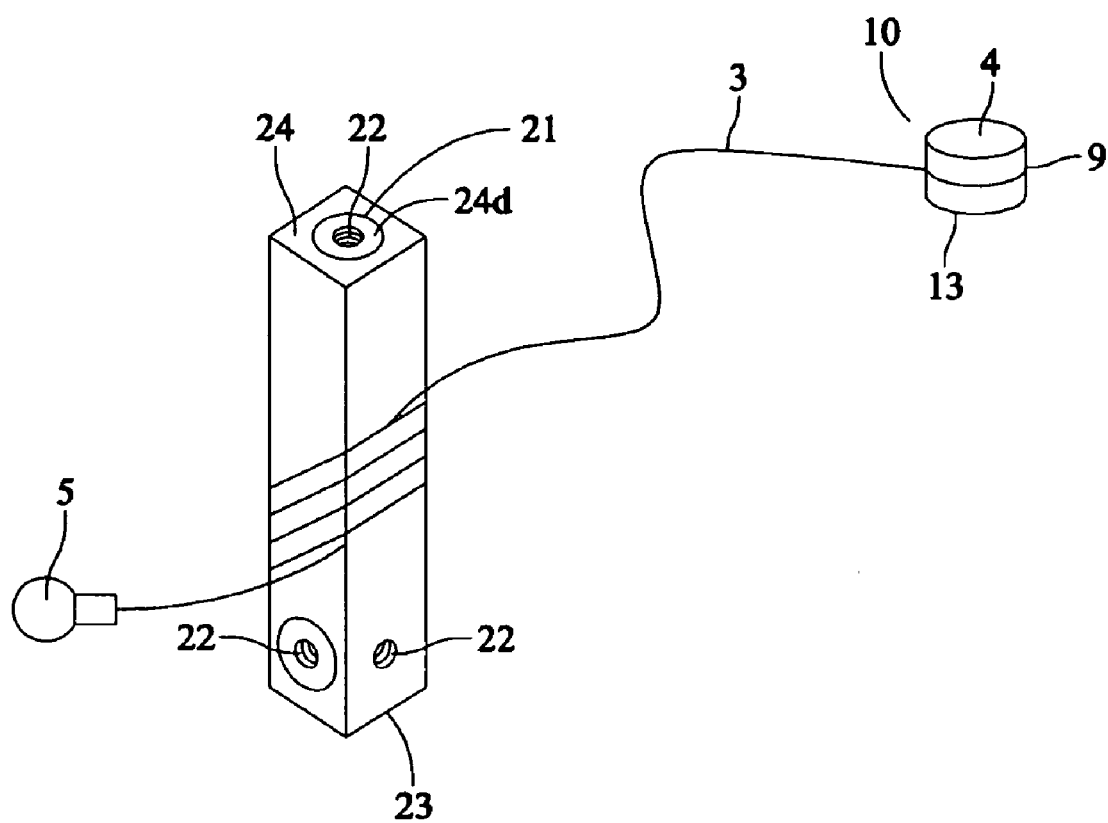
FIG. 7 is an isometric view of the small magnet tool with spool and string of the magnetic wire pulling system of the present invention.

Moving to FIG. 7, the present invention has a second key part with the medium magnet 10 attached to a string 3. The medium magnet 10 has a generally round cylindrical shape, permanent magnetism, and polarity indicated upon the faces 12, 13 of the medium magnet 10. Scoring as in a minus (−) sign or paint can indicate polarity. Generally centered upon the height of the medium magnet 10, a groove 9 runs upon the perimeter parallel to the faces 12, 13 of the medium magnet 10. The groove 9 provides a location for a secure attachment of the string 3 to the medium magnet 10.

The string 3 proceeds from the medium magnet 10 towards the medium spool 11. The string 3 is generally at least ten pound test line and abrasion resistant and has a length of at least five feet. At the spool, the string 3 winds around the medium spool 11 but has a 3/16 inch diameter eyelet 5 crimped to the end opposite the medium magnet 10. The eyelet 5 is ferrous and eases joining of pulling cord to the string 3.

The medium spool 11 has a generally rectangular cylindrical shape with four sides and two opposite ends 23, 24. Each end 23, 24 has a recess 21 for ready holding of the spool between the thumb and the middle finger of an electrician. One end 24 has a recess 21 containing a ferrous pin 22, such as a screw, inserted upon the longitudinal axis of the medium spool 11. The medium magnet 10 can rest in this recess 21. When unwinding the string 3, the spool spins freely between the thumb and the middle finger, thereby, reducing twisting and knotting of the string 3 during unwinding. Opposite the end 24 with the ferrous pin 22, the spool 11 has a medium socket as an alternate resting place for the medium magnet 10. Two perpendicular pins 22, preferably ferrous screws, are placed in the spool 11 and are magnetized when the medium magnet 10 is in the medium socket. When magnetized, the screws readily hold the metal eyelet 5 on the end of the string 3. The string 3 will not unwind after being wound upon the medium spool 11 because the eyelet 5 is held securely by magnetized screws.

Figure 8:
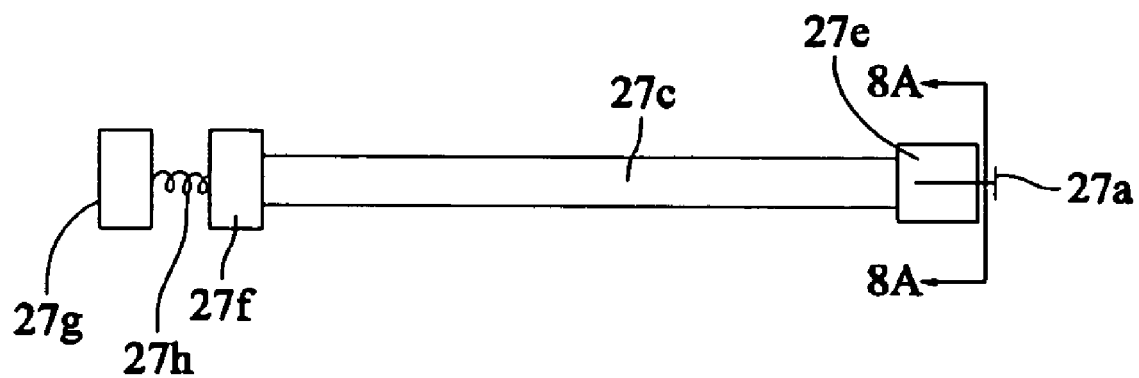
FIG. 8 is a side view of the insertion tool of the magnetic wire pulling system of the present invention.

FIG. 8 illustrates another tool, the insertion tool 27 preferably for the medium magnet 10 but alternatively provided for the small magnet 4. The insertion tool 27 comprises a 1/4 inch diameter copper tube 27b, c about one foot long. The tube 27b has a flared end inserted through a dowel handle 27f.

Figure 8A:
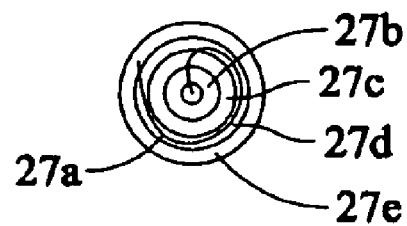
FIG. 8A is an end view of the insertion tool and string of the magnetic wire pulling system of the present invention.

Turning briefly to FIG. 8A, the tube 27b is then placed through a 3/8 inch diameter soft plastic tube 27c, about one foot long. The plastic tube 27c makes the tool easier to use and less likely to kink while bending the tube 27b. Opposite the dowel 27f, a 1/2 inch diameter inch long soft plastic tube, or filler tube, 27d is placed over the 3/8 inch diameter plastic tube 27c. This filler tube 27d supports the medium magnet 10 within a 5/16 inch deep opening. An outer tube 27e extends beyond the length of the copper tube 27b and surrounds the perimeter of a magnet, 10, 4.

Within the copper tube 27b is a 1/16 inch diameter stainless steel welding rod 27a about a foot long. This rod 27a opposite the dowel 27d has a loop slightly less than 1/2 inch in diameter, perpendicular to the rod 27a. This loop pushes the medium magnet 10 out of the insertion tool 27 and blocks the rod 27a from retracting too far into the copper tube 27b.

Opposite the loop, the rod 27a attaches to the release device. The release device consists of two coaxial dowels 27f, g with a push spring 27h between them. Each dowel 27f, g is about an inch in diameter and an inch long. The outer dowel 27g has a 3/8 inch diameter hole to accommodate the compression spring 27h. The inner dowel 27f has a 1/4 inch diameter hole to accommodate the copper tube 27b.

Between the two dowels 27f, g, a push spring 27h returns the rod 27a to the position away from the medium magnet 10. The push spring 27h is about 5/16 inch in diameter and about 1 inch long. The two dowels 27f, g are pushed together to compress the push spring 27h which provides a 1/4 inch movement of the rod 27a, thereby ejecting the medium magnet 10 out of the insertion tool 27 which will allow the large magnet 14 on the outer surface of a wall 2a or a ferrous tool to grasp the medium magnet 10 through the wall 2a surface.

Figure 9:
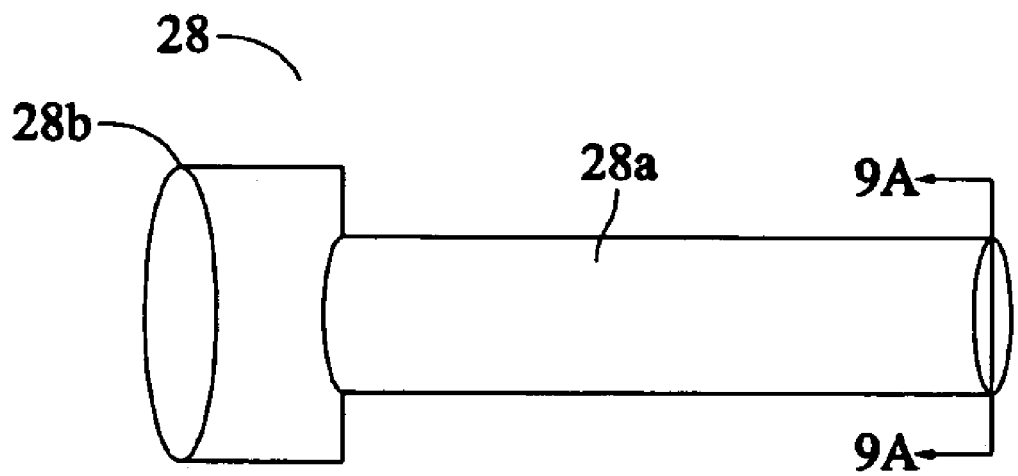
FIG. 9 is a side view of the automatic release tool of the magnetic wire pulling system of the present invention.

Then in FIG. 9, the automatic release tool 28 is illustrated having a barrel 28a and a fitting 28b. The barrel 28a has a round cylindrical shape with the fitting 28b upon one end. The barrel 28a is generally copper while the fitting 28b is steel. The fitting 28b has a threaded end opposite the barrel 28a. A pole 31 then attaches to the threaded end of the fitting 28b so the automatic release tool 28 can be extend some distance while holding the small magnet 4.

Figure 9A:
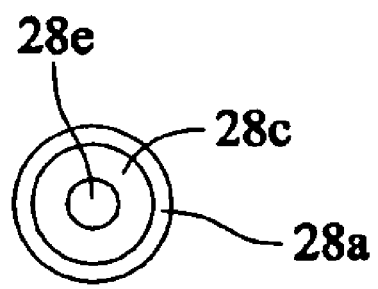
FIG. 9A is an end view of the automatic release tool of the magnetic wire pulling system of the present invention.

FIG. 9A describes the front end of the automatic release tool 28 opposite the fitting 28b. A washer assembly inserts into the tube at about a 2 inch depth and is crimped into position at about one half the depth of the small magnet 4 from the end. The washer assembly comprises a brass washer 28c with a central hole, a ferrous washer 28d with a central hole of lesser diameter than the brass washer 28c as shown in FIG. 9A, and a pop rivet 28e joining the ferrous to the brass washer 28c. The brass washer 28c is oriented outwards of the automatic release tool 28 as shown in FIG. 9B.

Figure 9B:
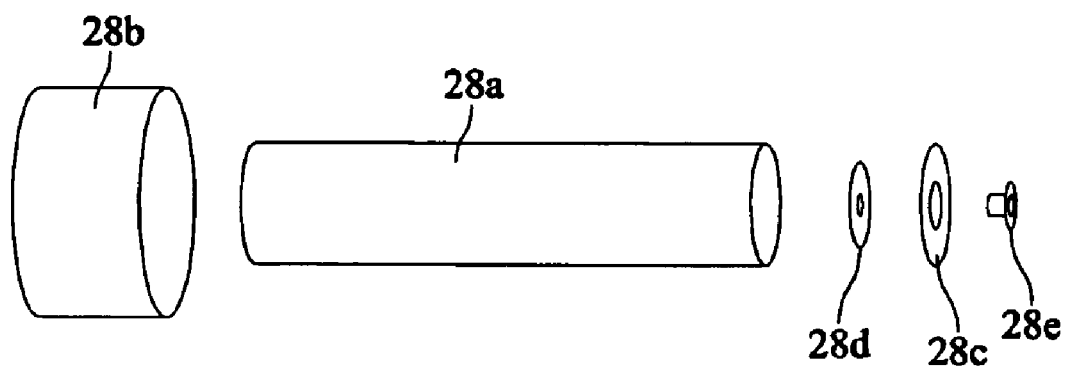
FIG. 9B is an exploded view of the automatic release tool of the magnetic wire pulling system of the present invention.

FIG. 9B shows the components of the automatic release tool 28 in an exploded view. Opposite the fitting 28b, the barrel 28a has a brass washer 28c and a ferrous wash 28d joined by a pop rivet 28e. The barrel 28a is generally a round cylinder of copper. Then the fitting 28b is also cylindrical and crimped upon the barrel 28a. Opposite the barrel 28a, the fitting 28b has a threaded opening to accept a pole 31. In an alternate embodiment, the fitting 28b comprises collets upon each end of a conduit union to permit joining the fitting 28b to electrical conduit.

The automatic release tool 28 reaches a steel drill bit used to drill from a wall wiring access hole up through the wall plates and into the attic 2j as in FIGS. 1, 2, 2A, and 3C. When the automatic release tool 28 nears the drill bit, a magnet with string 3 attached, will attract itself to the drill bit. When pulled, the drill bit pulls the string 3 and pulling cord from an attic 2j through the access hole or fixture hole. An electrician then has a pulling cord from the access hole in the wall 2a to an accessible point in an attic 2j.

Figure 10:
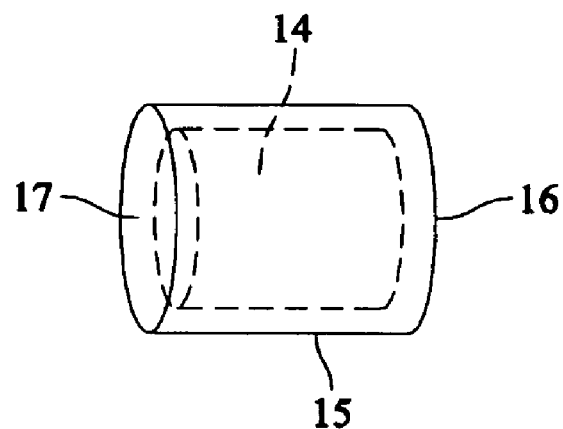
FIG. 10 is an isometric view of the large magnet of the magnetic wire pulling system of the present invention.

In FIG. 10, the large magnet 14 comprises a round cylindrical permanent magnet about an inch in diameter and in length. Teflon® 15 encases the large magnet 14 and the faces 16, 17 of the magnet 14 provide easier handling of the large magnet 14 and for less scratching or marring of a painted or wallpapered wall 2a, while moving the large magnet 14. In general, the large magnet 14 grasps the small 4 and medium magnets 10 through the wall surface. With the two magnets 14, 4 now together, the smaller magnet 4 can be moved from one access hole to another access hole by moving the large magnet 14 along the outer surface of the wall 2a.

Figure 11:
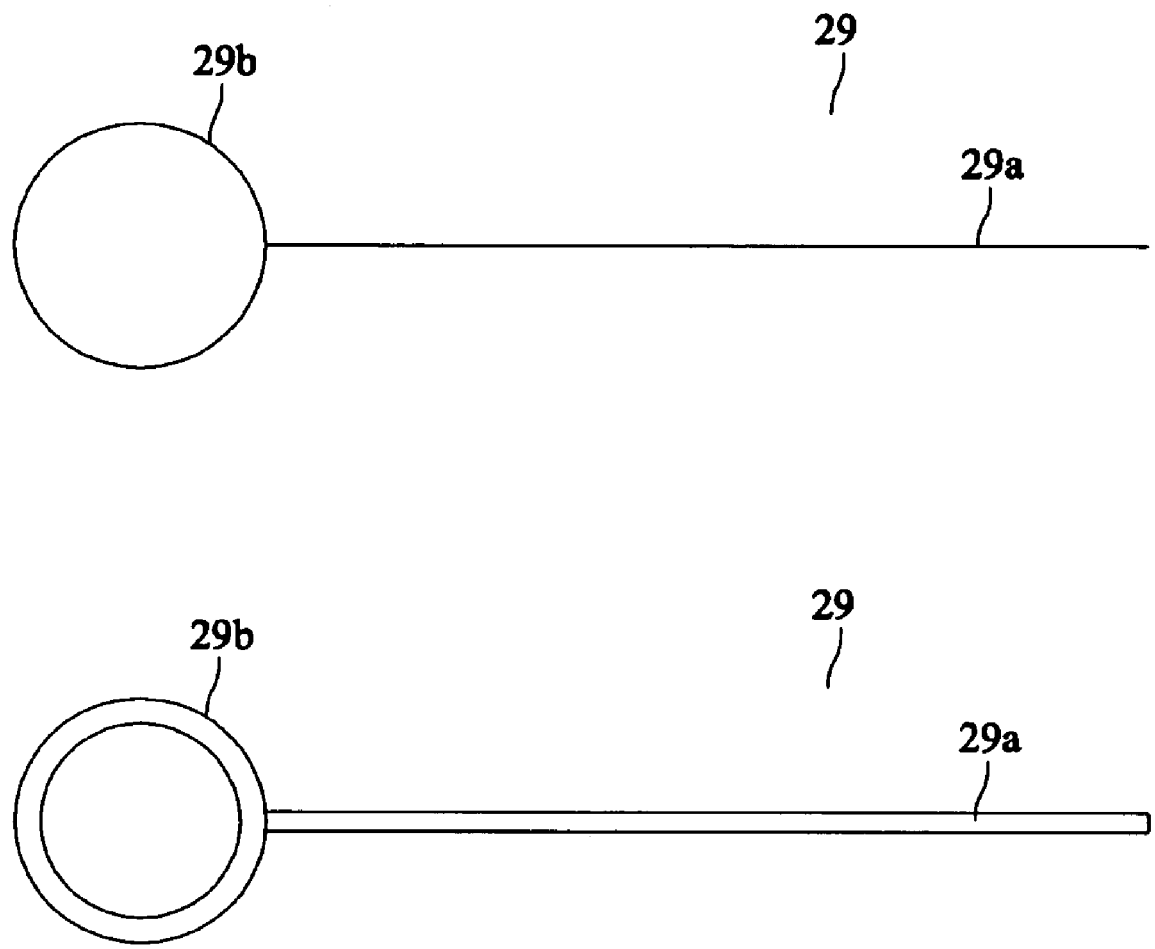
FIG. 11 is a side view of the magnet transfer tool of the magnetic wire pulling system of the present invention.

In FIG. 11, another tool is described, the transfer tool 29. In the preferred embodiment, the transfer tool 29 is a galvanized steel wire 29a with a handle 29b formed in one end. In an alternate embodiment, copper clad steel wire 29a comprises the transfer tool 29 with a handle 29b in one end. The transfer tool 29 moves the small magnet 4 in a blind space such as a ceiling 2c, mainly for a 90 degree pull from the ceiling 2c to a wall 2a access hole as shown in FIG. 2B.

Figure 12:
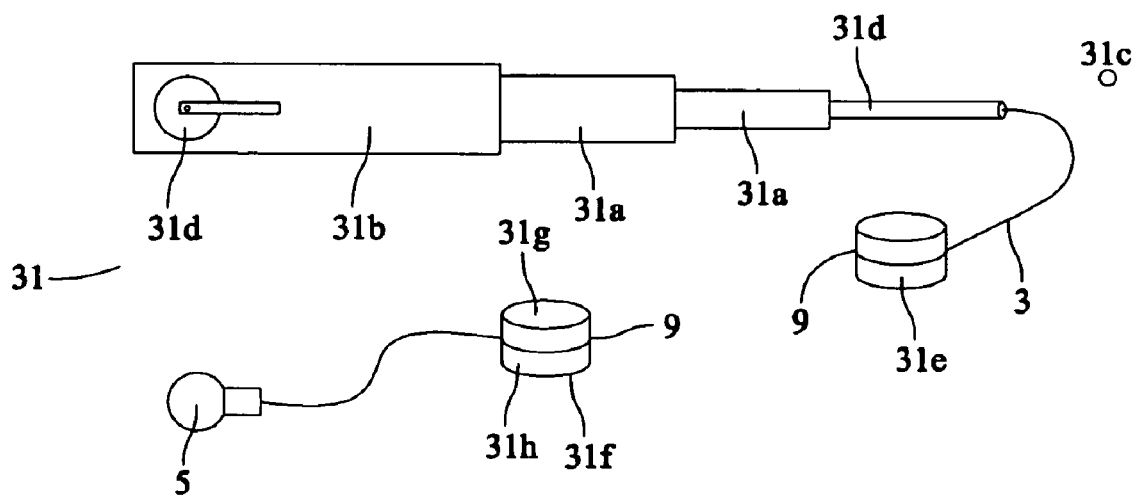
FIG. 12 is an isometric view of the telescoping pole with magnet tool of the magnetic wire pulling system of the present invention; and, FIG. 13 is an isometric view of the adjustable prop and locating procedure of the magnetic wire pulling system of the present invention.

As earlier described in FIG. 3C, the present invention has a telescoping pole 31 with magnet shown in FIG. 12. The telescoping pole 31 comprises a commercially available telescoping fishing rod 31b and reel 31d, equipped with at least ten pound test string 3, a fishing magnet 31e attached to the string 3, and a fourth magnet 31f upon a separate string 3 with an eyelet 5. The telescoping pole 31 has one or more nesting tubular sections 31a with a string 3 therein that collapse together. The string 3 is wound upon a reel 31d and exits the pole 31 through the narrowest section 31a. The string 3 secures to the fishing magnet 31e upon a perimeter groove 9 similar to the small 4 and medium magnets 10. The fourth magnet 31f also secures to one end of a separate string 3 with a groove 9 in the magnet's 31f perimeter. The fourth magnet 31f has top 31g and bottom faces 31h with polarity indicated by a minus (−) sign or paint. The telescoping pole 31 tool sees use as electricians encounter inaccessible spaces such as crawl spaces 2d and low roof line attics 2j.

With the telescoping pole 31 tool, the inaccessibility problem greatly reduces. With a strong, high test, string 3 and a small magnet 4 attached, an electrician can get a pulling cord from a service opening in a room to an accessible point in an attic 2j or crawl space 2d. In use, the fishing magnet will magnetically attract to the drill bit 2k when brought near. An example of use occurs when a hole is drilled through a floor 2b or ceiling 2c into a crawl space below a house 2 or into an attic 2j, and with the drill bit extended into the attic 2j or crawl space as in FIG. 3C, the fishing magnet can now attract to the drill bit 2k. When the drill bit 2k is pulled back through the floor 2b or the wall 2a, the magnet 4 and string 3 will follow the drill bit 2k through the starting access hole. By using the fourth magnet 31f with a pulling cord attached to the eyelet 5, the electrician now attaches the fishing 31e and fourth magnets 31f together. Next, the electrician winds the string 3 back to the accessible area in the attic 2j or crawl space and in doing so, has a pulling cord from the starting point in a room to the accessible point in the attic 2j or crawl space.

The telescoping pole 31 tool collapses to less than four feet long but extends to about 12 feet long. Possibly, an electrician can put a pipe extension on the end of the telescoping pole 31 tool that makes the tool reach a point 16 feet away through a normally inaccessible space. The fourth magnet 31f attracts to the fishing magnet 31e and stores inside the small end of the telescoping pole 31 tool behind a cap 31c.

Figure 13:
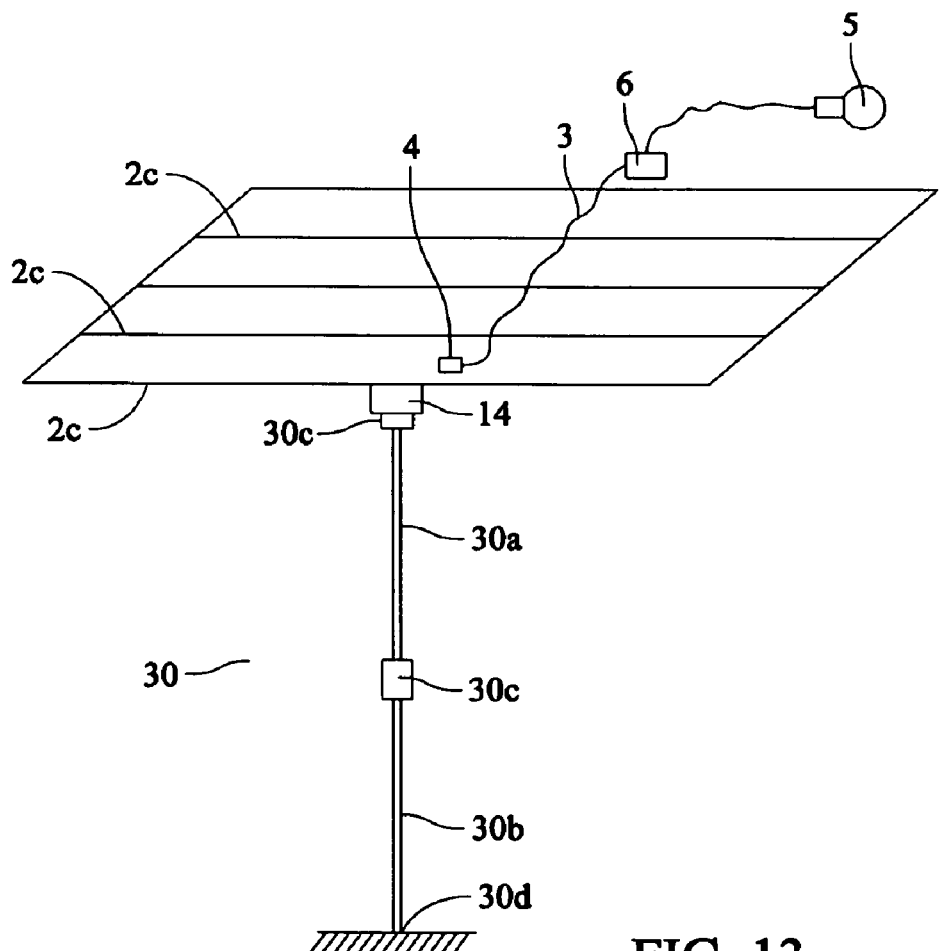

FIG. 13 shows another tool in use with the large magnet 14, the extendable prop 30. The extendable prop 30 comprises a footer 30d, a large shaft 30b, a coupling 30c, a small shaft 30a, and a header 30e. The footer 30d and the header 30e are about 1.25 inch diameter plastic discs. The large shaft 30b has a ¾ inch diameter while the small shaft 30a has a ½ inch diameter. The small shaft 30a passes through the coupling 30c and nests within the large shaft 30b. The large shaft 30b has less length than the small shaft 30a to prevent detaching of the header 30e when the small shaft 30a nests within the large shaft 30b. The footing 30d attaches to the bottom of the large shaft 30b and the header 30e attaches to the top of the small shaft 30a for easier handling of the prop 30 and less marring of finished surfaces. The coupling 30c is hollow to for passage of the small shaft 30a and clamps upon the small shaft 30a by twisting the coupling 30c. Some commercial models of the extendable prop 30 exist.

In an alternate embodiment, the extendable prop 30 has a coupling 30c made of a split compression ring and locking nut. The coupling further has a ¾ inch conduit coupler and a ½ inch conduit coupler joined by a partially split piece of ¾ inch conduit, about an inch long.

FIG. 13 describes using magnets to locate a reference point, in the ceiling 2c. As the large magnet 14 is held against the ceiling 2c with the extendable prop and the ceiling 2c consists of a ½ inch thick drywall 2a, the small magnet 4 can be used in the attic 2j and attracted to the large magnet 14 through the drywall 2al. This spot becomes a reference point for drilling the wire pulling hole in the proper location.

The same procedure holds true for locating a reference point in the basement or a crawl space.

The large magnet 14 is placed on the floor 2b near the wall 2a directly below a wiring access hole. Now the small magnet 4 is used in the basement or crawl space to locate the large magnet 14 through the floor 2b. The point at which the small magnet 4 located the large magnet 14 is now a reference point for drilling a hole through the sub-floor 2b and the lower wall 2a plate directly below the access hole being worked on.

In use, an electrician places the magnetic wire pulling system in many places. When making a 90 degree pull of wire from a wall 2a into a blind ceiling 2c (example, the first ceiling 2c of a two story house 2), the large magnet 14 needs to be propped up against the ceiling 2c when using the remote release tool. In some instances, the large magnet 14 needs to be held against the wall 2a when using the small or medium magnet 10 inside a wall 2a.

Now, the large magnet 14 and the small magnet 4 with attached string 3 are attracted together through the wall 2a. The electrician can now move the small magnet 4 and the string 3 from one access hole to another access hole by moving the large magnet 14 from the starting point of an access hole to the next access hole. As the electrician passes over the second access hole with the large magnet 14, the small magnet 4 will make contact with the large magnet 14.

With a string 3 extending from both access holes, an electrician can easily pull a wire through the inner portion of a wall 2a by attaching a wire to the far end of the string 3 from the small magnet 4. The electrician then pulls a wire through a space formerly inaccessible by other wire pulling methods.

Installing a light or a fan in the ceiling 2c or when making a 90 degree pull to get a string 3 from the ceiling 2c to a wall 2a access hole, the transfer tool 29 of FIG. 11 sees use. The task begins with making a small opening in the center of the ceiling 2c and inserting the small magnet 4. The electrician checks if he can move the magnet from the center of the ceiling 2c to the wall 2a with an access hole for a light switch. The electrician also checks that access hole in the wall 2a will be accessible to a basement area or a crawl space below the floor 2b to reach electrical power. The small magnet 4 will be inserted through the fixture 2e hole in the center of the ceiling 2c. The electrician then moves the small magnet 4 through the space above the ceiling 2c by using the large magnet 14 upon the ceiling 2c surface. When the electrician has moved the magnet to within inches of the wall 2a, he proceeds with the next step.

The electrician then moves the small magnet 4 back towards the center of the room about one foot away from the wall 2a. The electrician then makes the switch opening in the wall 2a. A flexbit 2k drills a ¾ inch diameter hole through the wall 2a plates at the ceiling 2c where the electrician had the small magnet 4 near the wall 2a. The electrician then holds the flexbit 2k in place after it protrudes about six inches through the wall 2a plates into the space between the ceiling 2c and the floor 2b above. Next, the electrician drills a small hole through the ceiling 2c at an angle toward the upper end of the protruding flexbit 2k inside the wall 2a.

The electrician then checks that the small magnet 4 is far enough away so that while drilling the small hole, the small drilling bit will not contact the small magnet. This small hole should be about 3 inches from the wall 2a at a point where the flexbit 2k is already inside the wall 2a. The electrician now moves the small magnet 4 directly over this 1/16 inch hole. The large magnet 14 is now moved straight down away from the ceiling 2c so that the small magnet 4 will stay in place over the small hole. Gravity holds the small magnet 4 in place. The transfer tool 29 now comes into play. Using the smaller diameter transfer tool 29, the electrician inserts the end of the tool through the small hole and then moves the small magnet 4 onto the flexbit 2k which is in the ceiling 2c space above the wall 2a access hole. The small magnet 4 magnetically attracts itself onto the end of the transfer tool 29. The electrician then extends the transfer tool 29 toward the flexbit 2k.

When the small magnet 4 comes near the flexbit 2k, it will magnetically attract itself to the flexbit 2k. Because the flexbit 2k has larger mass of steel than the transfer tool 29, the small magnet 4 will hold fast onto the flexbit 2k. The electrician then removes the smaller diameter transfer tool 29 and checks for plenty of free string 3 hanging out of the hole in the center of the ceiling 2c to reach the switch access hole in the wall 2a. The electrician carefully pulls the flexbit 2k out of the access hole and the small magnet 4 will follow through the opening in the wall 2a. It may be necessary to turn the flexbit 2k counterclockwise while pulling the bit and the small magnet 4 through the wall 2a plate. The electrician now has a pulling string 3 from the wall 2a access hole to the center of the ceiling 2c while doing minimal damage to the ceiling 2c.

While a preferred embodiment of the magnetic wire pulling system and its various tools has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as plastic, metal, composite, stone, or a variety of wood may be used instead of the conduit described. Although positioning string to pull wire beyond obstacles in a structure, it should be appreciated that the magnetic wire pulling system herein described is also suitable for pulling wire through non-ferrous pipes and water.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A system for pulling wire through a house or other structure with a string tied to a pulling cord then tied to a wire wherein the improvement comprises:

one or more small magnets having said string, an eyelet, and a small spool, said small magnet having a generally round cylindrical shape, a top face and a bottom face said faces marked to indicate polarity, and a groove centered upon the circumference of said small magnet, said string being tied and secured around said groove at one end and around said eyelet at the opposite end and stored upon said small spool;

one or more medium magnets having said string, an eyelet and a medium spool, said medium magnet having a generally round cylindrical shape of greater diameter than said small magnet, a top face and a bottom face said faces marked to indicate polarity, and a groove centered upon the circumference of said medium magnet, said string being tied and secured around said groove at one end and around said eyelet at the opposite end and stored upon said medium spool;

one or more large magnets encased in a covering, said large magnet having a generally round cylindrical shape with rounded edges of greater diameter than said medium magnet, a top face and a bottom face, said faces marked to indicate polarity; and, one or more tools attracted to said magnets;

whereby a bigger magnet attracts a smaller magnet or any of said magnets attract a tool to advance said string beyond an obstacle in said structure.

2. The wire pulling system of claim 1 wherein said small magnet, and said medium magnet have rounded edges and are nickel plated.

3. The wire pulling system of claim 1 wherein said large magnet is encased in nylon or Teflon.

4. The wire pulling system of claim 1 wherein said string has at least thirty pound test strength.

5. The wire pulling system of claim 1 further comprising:

said small spool having a rectangular prismatic shape with a first end and opposite second end, said first end and said second end each having a round recess perpendicular to the longitudinal axis of said small spool in which said small magnet rests proximate to said first end, said small spool having two pins, mutually perpendicular and in contact at the center of said small spool, said pins having a wide end and a narrow end;

whereby, said small magnet is placed upon said wide end of one of said pins thereby magnetizing both of said pins, said string is wrapped upon said spool, and said eyelet secures to said narrow end of said pin for storage; and, said medium spool having a rectangular prismatic shape with a first end and opposite second end, said first end and said second end each having a round recess perpendicular to the longitudinal axis of said small spool in which said medium magnet rests, said second end having a pin inserted longitudinally in said spool upon which said medium magnet may also rest;

proximate to said first end, said medium spool having two pins, mutually perpendicular and in contact with each other at the center of said small spool, said pins having a wide end and a narrow end;

whereby, said medium magnet is placed upon said second end for storage, said string is wrapped upon said spool, and said eyelet secures to said narrow end of said pin for storage.

6. The wire pulling system of claim 1 further comprising:

said tools attracted to said magnets having:

a retrieval tool;

a manual release tool attached to a pole for said small magnet;
an insertion tool for said medium magnet;
an automatic release tool attached to a pole for said small magnet or said medium magnet;
a transfer tool; and,
an extensible prop having two or more telescoping sections with a header sized to accept said large magnet.

7. The wire pulling system of claim 1 further comprising:
a pole having three or more telescoping sections, a handle and an opposite cap;
a reel within said handle containing string, said string having two ends, the first end secured to said reel and the second end extending through said sections terminating in a fishing magnet secured to said second end; and, a fourth magnet having said string and an eyelet, said separate magnet having a generally round cylindrical shape, a top face and a bottom face said faces marked to indicate polarity, and a groove centered upon the circumference of said separate magnet, said string being tied and secured around said groove at one end and around said eyelet at the opposite end, said string having a length no more than three feet;

whereby, said pole is extended manually to position said fishing magnet proximate to said fourth magnet dropped through said structure whereupon said fourth magnet attracts to said fishing magnet for reeling in said string pulling a cord attached to said eyelet of said separate magnet.

\* \* \* \* \*